(12) United States Patent
Shibata et al.

(10) Patent No.: US 8,104,182 B2
(45) Date of Patent: Jan. 31, 2012

(54) PORTABLE BAND SAWS

(75) Inventors: Yoshinori Shibata, Anjo (JP); Akinori Ito, Anjo (JP)

(73) Assignee: Makita Corporation, Anjo-shi (JP)

( * ) Notice: Subject to any disclaimer, the term of this patent is extended or adjusted under 35 U.S.C. 154(b) by 375 days.

(21) Appl. No.: 11/527,586

(22) Filed: Sep. 27, 2006

(65) Prior Publication Data
US 2007/0068011 A1 Mar. 29, 2007

(30) Foreign Application Priority Data

Sep. 27, 2005 (JP) .................. 2005-280308

(51) Int. Cl.
*B23D 53/02* (2006.01)
(52) U.S. Cl. ........................... 30/380; 30/514
(58) Field of Classification Search ................. 30/166.3, 30/380, 388, 514, 517
See application file for complete search history.

(56) References Cited

U.S. PATENT DOCUMENTS

| 4,555,849 A * | 12/1985 | Ando et al. ................. 30/388 |
| 4,589,208 A * | 5/1986 | Iwasaki et al. ............. 30/376 |
| 6,736,037 B2 * | 5/2004 | Dean ............................. 83/13 |
| 6,775,913 B2 * | 8/2004 | Fey et al. .................... 30/388 |
| 7,287,454 B2 * | 10/2007 | McIntosh ................... 83/788 |
| 2003/0037445 A1 * | 2/2003 | Fey et al. .................... 30/388 |
| 2005/0188550 A1 * | 9/2005 | Uehlein-Proctor et al. .... 30/380 |

FOREIGN PATENT DOCUMENTS

| GB | 2411148 A | * | 8/2005 |
| JP | 1048950 | | 9/1999 |
| JP | 2000042949 A | * | 2/2000 |
| JP | A 2001-300819 | | 10/2001 |

* cited by examiner

*Primary Examiner* — Kenneth E. Peterson
*Assistant Examiner* — Jennifer Swinney
(74) *Attorney, Agent, or Firm* — Oliff & Berridge, PLC

(57) ABSTRACT

A portable band saw has a main housing and a saw band circulating within the main housing. A motor for driving the saw band is disposed within a motor housing that is mounted to the main housing. The main housing defines an opening across which the saw band moves in order to cut a workpiece. A battery for driving the motor is mounted to a motor receiving portion of the motor housing. The motor receiving portion has a width corresponding to the width of the opening and opposing to the opening in the forward and rearward directions.

13 Claims, 5 Drawing Sheets

PORTABLE BAND SAWS

This application claims priority to Japanese patent application Serial number 2005-280308, the contents of which are incorporated herein by reference.

BACKGROUND OF THE INVENTION

1. Field of the Invention

The present invention relates to portable band saws that have a saw band driven by an electric motor.

2. Description of the Related Art

Japanese Laid-Open Patent Publication No. 2001-300819 teaches a known portable band saw that may include a pair of drive wheels respectively rotatably supported on right and left end portions of a housing, a saw band extending between the drive wheels, an electric motor disposed within the upper portion of the housing in the central position with respect to right and left directions, and a light illuminating a region where the saw band intersects with a workpiece.

Known portable band saws may also use an external power source or a battery as a power source in this kind of power tool.

The use of the battery may improve the portability of the band saw. However, there has been a problem that the weight of the battery may adversely affect the operability of the band saw.

SUMMARY OF THE INVENTION

It is accordingly an object of the present invention to teach improved techniques for minimizing or eliminating adverse effects the weight of a battery has on a portable band saw.

According to one embodiment of the present invention, a portable band saw can include a main housing, a saw band, a motor mounted on the housing and coupled to the saw band, so that the saw band circulates within the housing across the opening, a battery mounted to the housing and connected to the motor in order to Supply a power to the motor wherein the battery has a gravity center that is substantially with a gravity center of an assembly of the other elements of the portable band saw when the portable band saw is in an operational position for cutting a workpiece.

DETAILED DESCRIPTION OF THE INVENTION

Each of the additional features and things disclosed above and below may be utilized separately or in conjunction with other feature and teachings to provide improved portable band saws. Representative examples, or the embodiments of the present invention, utilize many of these additional features and teachings both separately and in conjunction with one another, will now be described in detail with reference to the attached drawings. This detailed description is merely intended to teach a person of skill in the art further details for practicing preferred embodiments of the present invention and is not intended to limit the scope of the invention. Only the claims define the scope of the claimed invention Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
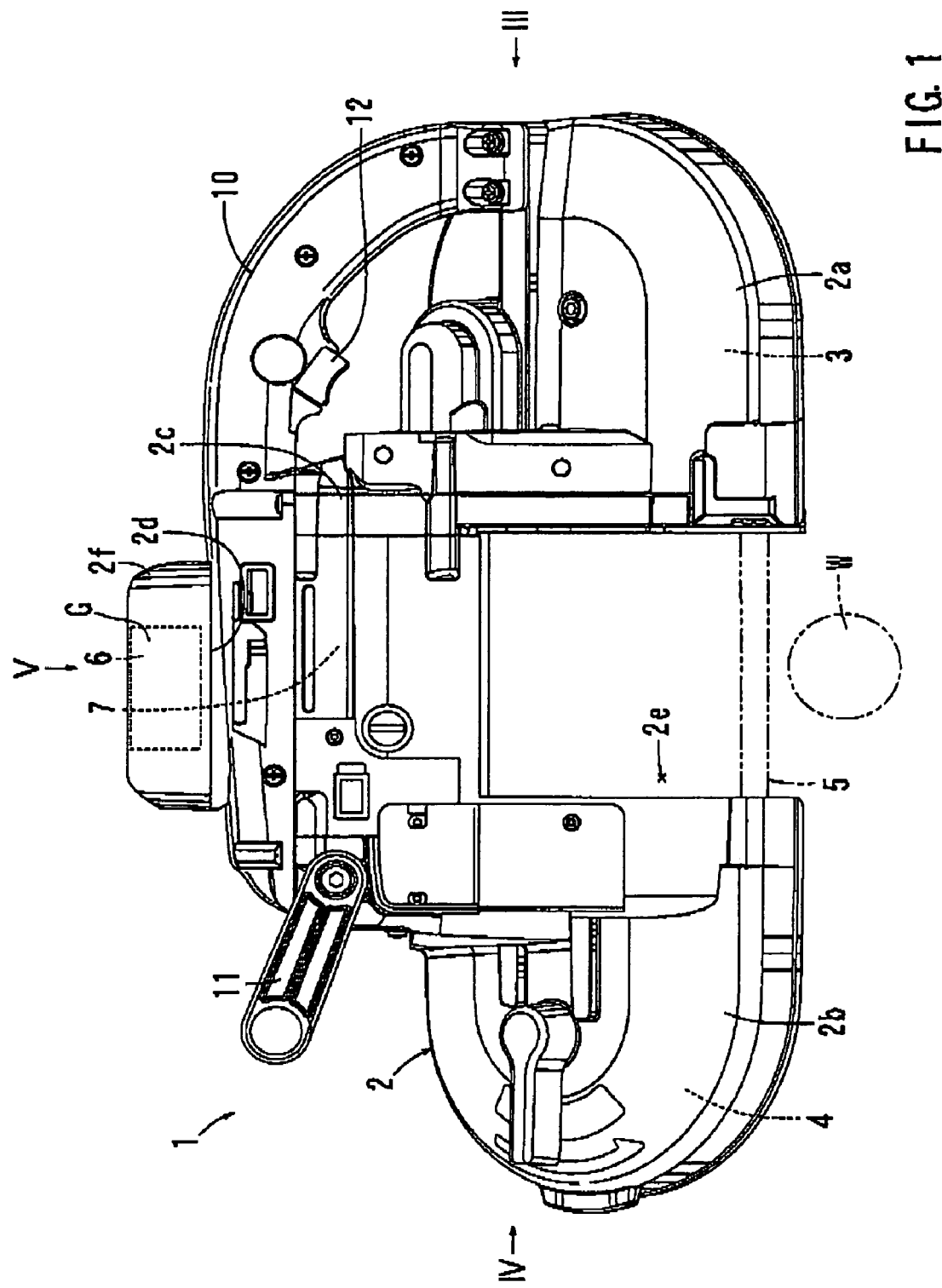
FIG. 1 is a front view of a portable band saw according to one embodiment and showing an operational position of the portable band saw for cutting a workpiece.

One embodiment of the present invention will now be described with reference to FIGS. 1 to 5. As shown in FIG. 1, a portable band saw 1 according to the this embodiment generally includes a housing 2, first and second drive wheels 3 and 4 respectively rotatably mounted to the right and left end portions as viewed in FIG. 1 of the housing 2, a saw band 5 extending between the drive wheels 3 and 4, an electric motor 7 positioned substantially the centrally with respect to right and left directions as viewed in FIG. 1 of the housing 2, and a battery 6. A main handle 10 is disposed on the right upper portion of the housing 2. An auxiliary handle 11 is disposed on the left upper portion of the housing 2.

Figure 3:
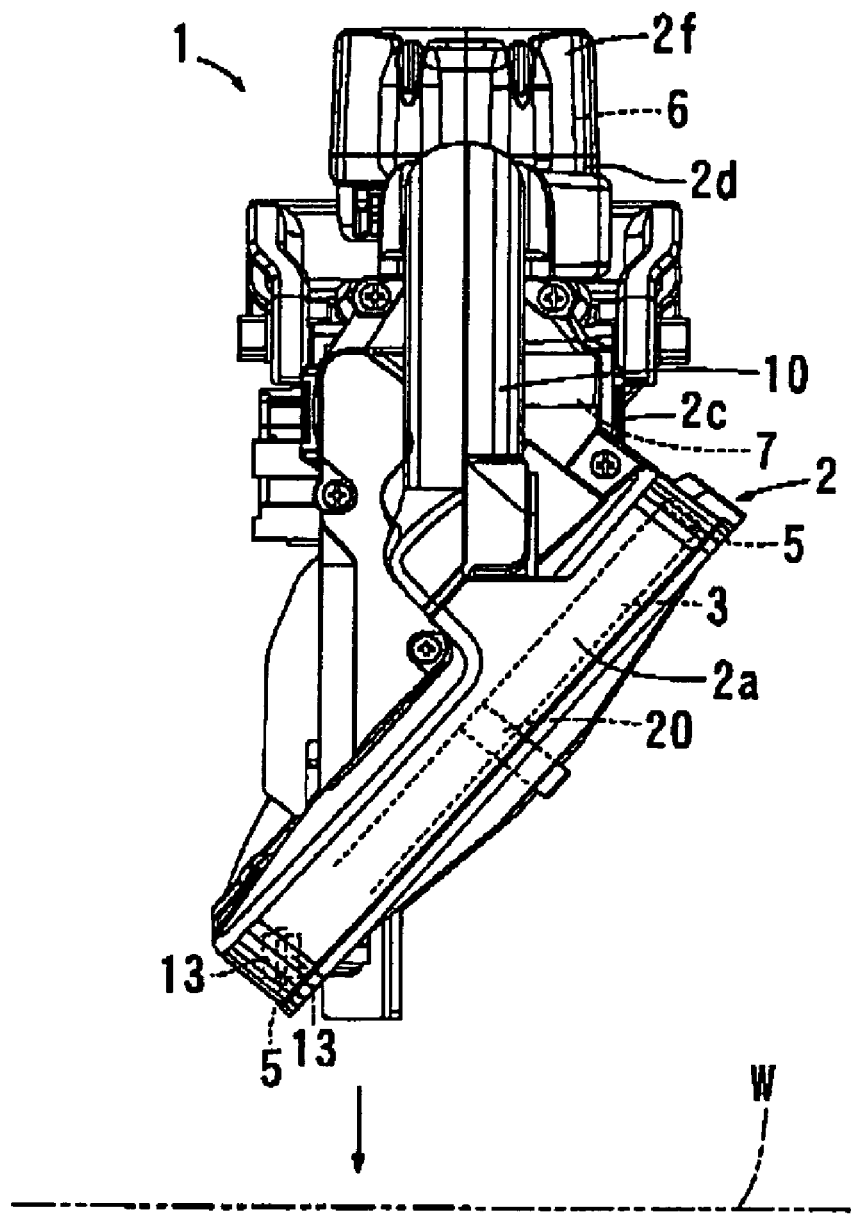
FIG. 3 is a right side view of the portable band saw as viewed in a direction indicated by arrow III in FIG. 1.
Figure 4:
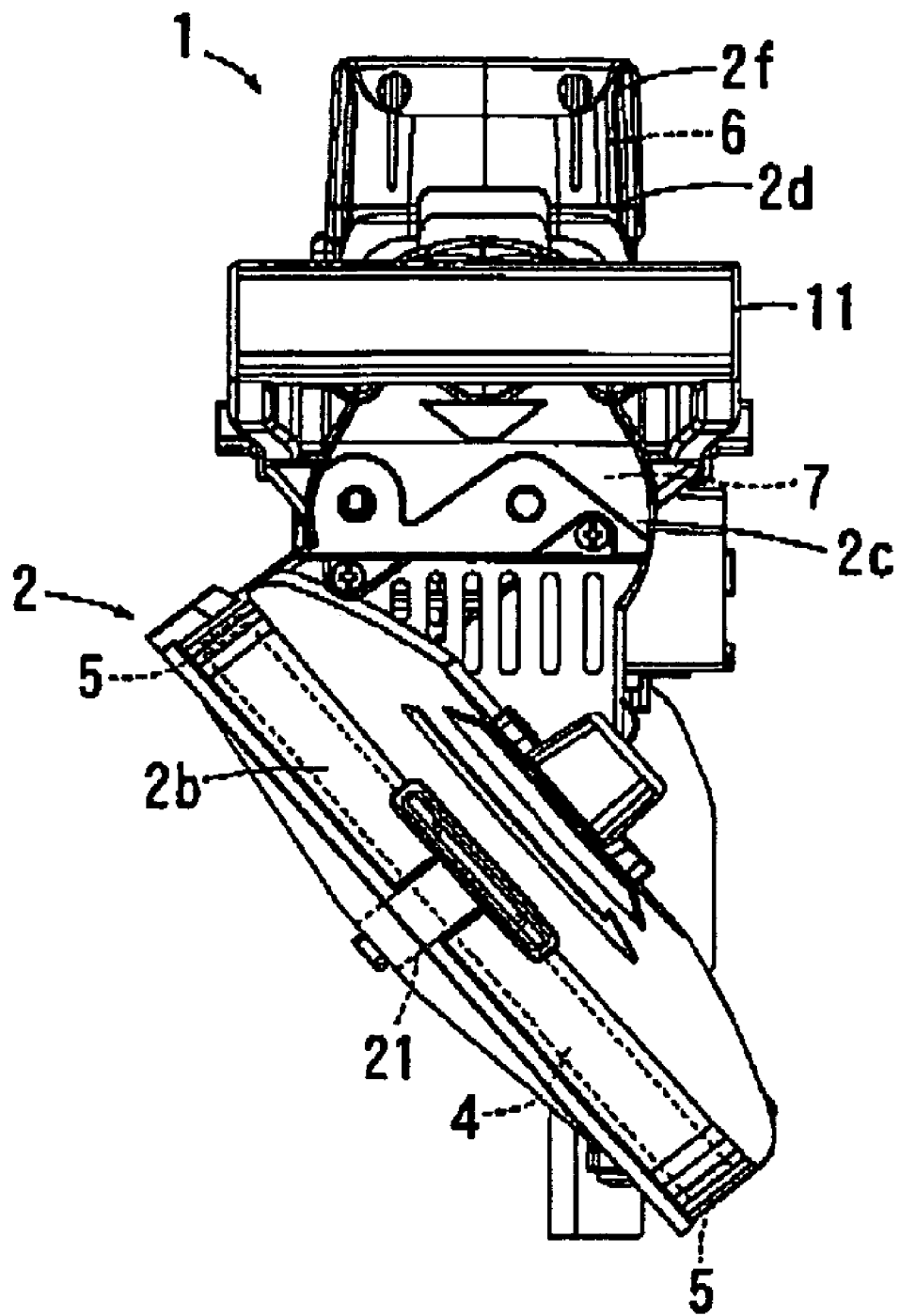
FIG. 4 is a left side view of the portable band saw as viewed in a direction indicated by arrow IV in FIG. 1.

As shown in FIG. 1, the housing 2 has a first shell 2a and a second shell 2b respectively disposed on right and left sides of the housing 2. A motor housing 2c is disposed substantially centrally of the housing 2. Each of the first and second shells 2a and 2b has a hollow structure and has a substantially flat configuration. As shown in FIG. 3, the first drive wheel 3 is disposed within the first shall 2a and is rotatably supported by the first shell 2a via a shaft 20. As shown in FIG. 4, the second drive wheel 4 is disposed within the second shell 2b via a shaft 21.

Figure 2:
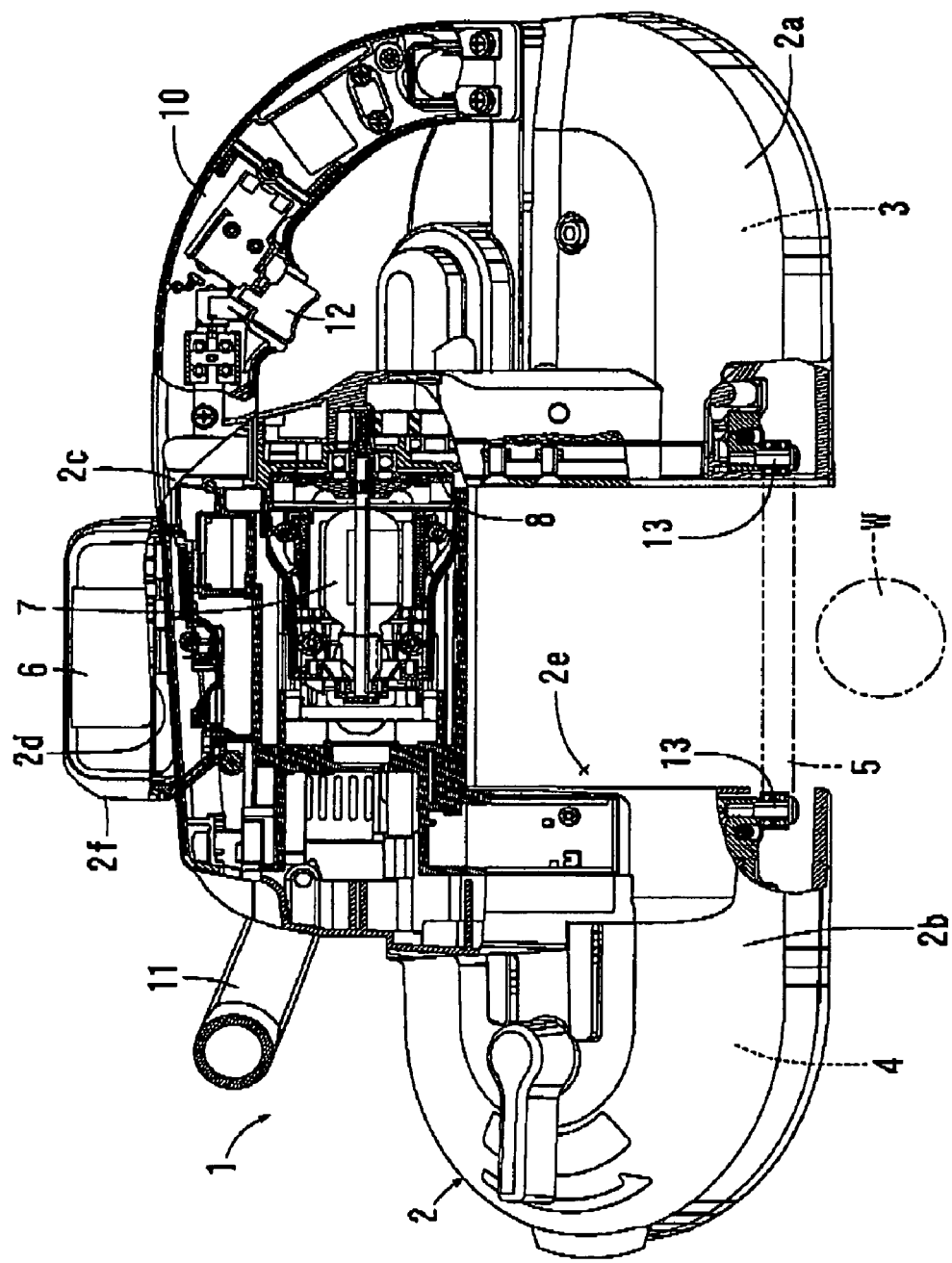
FIG. 2 is a front view similar to FIG. 1 with some portions of the portable band saw shown in a cross sectional view.
Figure 5:
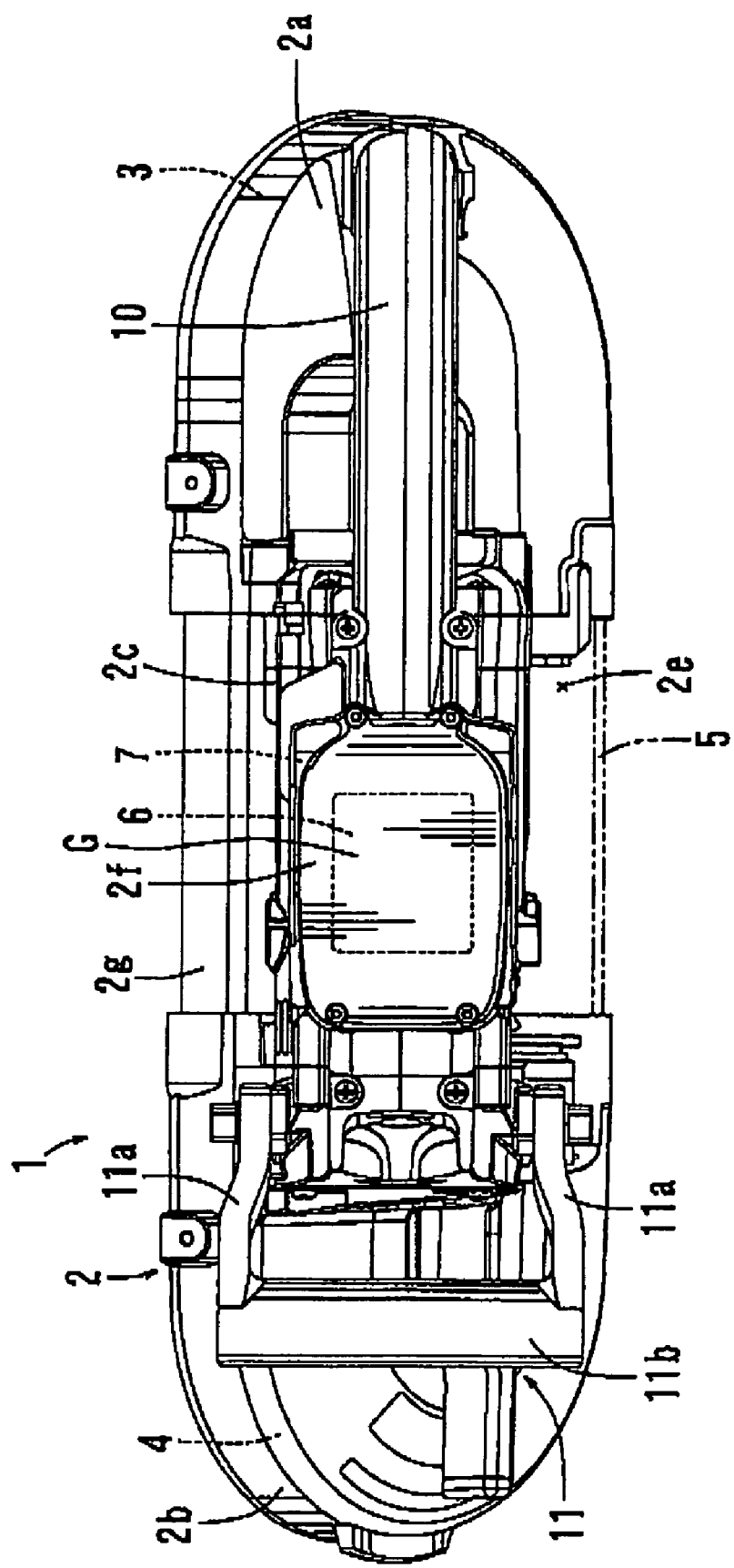
FIG. 5 is a plan view of the portable band saw as viewed in a direction indicated by arrow V in FIG. 1.

As shown in FIGS. 3 and 4, during the use of the band saw 1, the first and second shells 2a and 2b are positioned to incline relative to a surface of a workpiece W. More specifically, the first and second shells 2a and 2b are inclined such that their rear side (right side as viewed in FIGS. 3 and 4) is positioned at a higher level than their front side (left side as viewed in FIGS. 3 and 4). Therefore, during the use of the band saw 1, the drive wheels 3 and 4 are also positioned to incline relative to the surface of the workpiece W. The saw band 5 is engaged around the outer circumferential surfaces of the first and second drive wheels 3 and 4, The saw band 5 may be made of metal and is configured as an endless loop. Saw teeth are formed on a lower edge as viewed in FIGS. 3 and 4 of the saw band 5. The saw band 5 moves or circulates along and within the outer circumferential wall of the housing 2. As shown in FIGS. 2 and 5, an opening 2e is formed in the front portion of housing 2 near a central position with respect to the right and left directions, so that the saw band 5 is exposed to the outside at the opening 2e.

As shown in FIGS. 2 and 3, a pair of rollers 13 are mounted to the housing 2 in positions on opposite sides of the opening 2e. The rollers 13 engage the saw band 5 in order to incline a portion of the saw band 5 between the rollers 13 relative to the remaining portion of the saw band 5, so that the portion of the saw band 5 between the rollers 13 is substantially perpendicular to the surface of the workpiece W during the use of the band saw 1. Therefore, the saw band 5 can be pressed against the workpiece W in the vertical direction in order to cut the workpiece W.

As shown in FIG. 5, the rear side portions of the first shell 2a and the second shell 2b are connected to each other via a joint pipe 2g, through which the saw band 5 can extend.

As shown in FIGS. 1 and 3, the motor housing 2c is positioned above the first and second shells 2a and 2b in order to bridge the first and second shells 2a and 2b.

As shown in FIG. 2, the electric motor 7 can be disposed within the motor housing 2c, and in particular, can be within a motor receiving portion of the motor housing 2c. Here, the motor receiving portion is used to mean a portion of the motor housing 2c, which opposes to the opening 2e and has approximately the same width as the opening 2e in right and left directions as viewed in FIG. 2.

As shown in FIG. 2, the electric motor 7 is oriented horizontally within the motor housing 2, so that the output shaft of the motor 7 extends in right and left directions as viewed in FIG. 2. A power transmission mechanism 8 transmits the rotation of the electric motor 7 to the first drive wheel 3. The power transmission mechanism 8 may be configured as a reduction gear mechanism having a plurality of gears disposed within the motor housing 2c and the first shell 2a.

As shown in FIGS. 1 and 2, the battery 6 for supplying power to the electric motor 7 is mounted to a mount portion 2d disposed on the motor housing 2c. The mount portion 2d is positioned near the upper side of the motor receiving portion of the motor housing 2c, which is opposed to the opening 2e and corresponds to the width of the opening 2e in right and left directions as described in connection with the motor 7. More importantly, with this arrangement, the battery 6 is positioned such that its gravity center G is positioned within the width of the motor receiving portion.

As shown in FIG. 1, the width of the battery 6 is configured to be smaller than the width of the opening 2e, so that the entire battery 6 can be positioned within the width of the motor receiving portion of the motor housing 2c. In addition, as shown in FIG. 5, in the mounted state, the battery 6 may not extend into the space above the opening 2e when viewed from the above during the use of the band saw 1.

Further, as shown in FIG. 5, the battery 6 can be positioned substantially centrally of the housing 2 with respect to right and left directions and also with respect to the forward and rearward direction (upward and downward directions as viewed in FIG. 5).

With the above arrangement, the battery 6 can be positioned between the main handle 10 and the auxiliary handle 11. In addition, both of the main handle 10 and the auxiliary handle 11 are positioned centrally of the motor housing 2c, or the housing 2 with respect to the forward and rearward directions as viewed in FIG. 5. Therefore, when the band saw 1 has been held by an operator by grasping the main handle 10 with one hand and grasping the auxiliary handle 11 with another hand, the configuration of battery 6 (as described above), will contribute to better balance the band saw 1 and thus enhance the operability.

Furthermore, the as shown in FIGS. 2 and 5, the battery 6 can be positioned above the output shaft of the electric motor 7, thus the battery 6 would be mounted to the upper side of the motor housing 2.

As shown in FIGS. 1 and 5, the battery 6 can be covered by a battery cover 2f that is detachably mounted to the upper side of the motor receiving portion of the motor housing 2c. Also, the battery cover 2f can be configured such that is does not extend into the space above the opening 2e when viewed from the above during the use of the band saw 1.

As shown in FIG. 1, the main handle 10 extends between the right end of the first shell 2a and a right upper portion of the motor housing 2c, so that the main handle 10 can be easily grasped by the right hand of the operator. As shown in FIG. 2, a trigger switch 12 can be mounted to the man handle 10 and is operable to permit and prevent the supply of power from the battery 6 to the electric motor 7.

As shown in FIGS. 1 and 5, the auxiliary handle 11 includes a pair of extensions 11a extending leftward from the left end of the motor housing 2c and a cylindrical grip 11b connecting between the left ends of the extensions 11a. The extensions 11a and the cylindrical grip 11b can be formed integrally with each other. With this arrangement, the auxiliary handle 11 can be easily grasped by the left hand of the operator.

In order to cut the workpiece W, such as a tubular material, by the band saw 1, the operator can grasp the main handle 10 with the right hand and grasp the auxiliary handle 11 with the left hand. Then, the operator may lift and hold the band saw 1 with both hands. Thereafter, the operator may pull the trigger switch 12, so that a power is supplied from the battery 6 to the electric motor 7 to start the electric motor 7. Therefore, the first drive wheel 3 is rotated by the electric motor 7 to circulate the saw band 5. After that, the operator may bring the band saw 1 to a position above the workpiece W such that the opening 2e of the housing 2 vertically opposes to the workpiece W. Then, the operator lowers the band saw 1, so that a portion of the circulating saw band 5 exposed at the opening 2e may be pressed against the workpiece W in order to cut the workpiece W.

As described above, the battery 6 is mounted to the mount portion 2d that is positioned near the upper side of the motor receiving portion of the motor housing 2c, while the motor receiving portion opposes the opening 2e and corresponds to the width of the opening 2e in right and left directions. Therefore, the weight of the battery 6 can be effectively applied to the workpiece W via the band saw 5 in order to cut the workpiece W. In other words, the weight of the workpiece W can be effectively used for cutting the workpiece W. As a result, the operability of the band saw 1 can be improved.

In addition, the length of the battery 6 is shorter than the width of the opening 2e and can be positioned within the width of the motor receiving portion of the motor housing 2c. Because the width of the motor receiving portion is determined to have approximately the same width as the opening 2e, the battery 6 also is positioned within the width of the opening 2e. Therefore, the weight of the workpiece W can be further effectively used for cutting the workpiece W, and the operability of the band saw 1 can be ether improved.

Further, the battery 6 is positioned near the upper side of the motor housing 2c and may not extend into the region above the opening 2e during the use of the band saw 1. Therefore, the battery 6 does not obscure the opening 2e from being viewed from the upper side of the band saw 1. As a result, the operator can perform the cutting operation, while he or she observes a portion of the saw band 5 that is exposed to the opening 2e and is cutting the workpiece W. Therefore, the operability of the band saw 1 can be further improved.

Furthermore, the main handle 10 and the auxiliary handle 11 are mounted to right and left sides of the motor housing 2c and the central lines extending through the gravity centers of the main handle 10 and the auxiliary handle 11 with respect to forward and rearward directions are substantially aligned with each other and are also substantially vertically aligned with or coincides with the central line of the motor housing 2c with respect to forward and rearward directions when the band saw 1 is in the operational position shown (see FIGS. 3 and 4). Therefore, this configuration will contribute to better balance band saw 1 with respect forward and rearward directions when the band saw 1 was held by the operator with the main handle 10 and the auxiliary handle 11 grasped with hands of the operator.

More preferably, the central lines of the main handle 10 and the auxiliary handle 11 with respect to forward and rearward directions extend through or vertically aligned with the gravity center of the entire band saw 1 including the battery 6 at least when the band saw 1 is in the operational position.

Further, because the battery 6 is positioned near the upper side of the motor housing 2c as show in FIG. 1, thus the operation for mounting and removing the battery 6 can be easily performed.

The present invention may not be limited to the embodiment described above but may be modified in various ways as follows:

(1) In the above embodiment, the battery cover 2f for covering the battery 6 is configured as a separate member from the motor housing 2c. However, the battery cover 2f may be formed integrally with the motor housing 2c.

(2) In the above embodiment the battery 6 is positioned near the upper side of motor receiving portion of the motor housing 2c. However, the battery 6 may be positioned near the front or rear side of the motor receiving portion.

(3) In the above embodiment, the trigger 12 is mounted to the main handle 10, so that the trigger 12 may be operated by the right hand of the operator. However, the positions of the main handle 10 and the auxiliary handle 11 may be hanged to each other, so that the trigger 12 can be operated by the left hand of the operator.

This invention claims:

1. A portable band saw comprising:
   a main housing having a right side and a left side in right and left directions, and a front side and a rear side in forward and rearward directions;
   a pair of drive wheels respectively rotatably disposed on the right side and the left side of the main housing;
   a saw band engaged by the drive wheels and extending between the drive wheels;
   a motor housing disposed centrally of the main housing with respect to the right and left directions and positioned above the main housing;
   an electric motor disposed within the motor housing and coupled to at least one of the drive wheels, so that the saw band circulates as the at least one of the drive wheels is driven by the electric motor;
   a battery for supplying electric power to the electric motor; and
   an opening provided in the main housing, the opening positioned centrally of the main housing with respect to the right and left directions and on the front side of the main housing, so that the saw band moves in the right and left directions across the opening,
   wherein the opening has right and left boundaries between the opening and the right side and the left side of the main housing, respectively;
   the motor housing has a motor receiving portion, a width of the motor receiving portion in the right and left directions not extending beyond the right and left boundaries of the opening;
   the battery is mounted to the motor receiving portion;
   the battery has a width in the right and left directions, the width of the battery being shorter than the width of the motor receiving portion, and the battery being disposed within the width of the motor receiving portion;
   the portable band saw further includes a first handle and a second handle respectively mounted to the right side and the left side of the motor housing;
   the battery is positioned between the first handle and the second handle;
   each of the first handle and the second handle has a width in the forward and rearward directions;
   the battery has an outer periphery in plan view as viewed from a top of the battery along an axis of the battery, the outer periphery of the battery in the forward and rearward directions being positioned within the width of at least one of the first handle and the second handle as viewed from the top of the battery along the axis of the battery, and
   substantially the entire battery protrudes beyond the first handle and the second handle in a direction away from the motor housing along the axis of the battery.

2. The portable band saw as in claim 1, wherein the battery is mounted to the motor receiving portion and is positioned in a manner such that the outer periphery of the battery in the forward direction does not extend beyond the front side of the motor housing as viewed from the top of the battery along the axis of the battery so as not to extend into the opening as viewed along the axis of the battery.

3. The portable band saw as in claim 1, wherein a physical center of the top of the battery, physical centers of the first and second handles, and a physical center of the motor housing with respect to forward and rearward directions are located on a single straight line extending in the right and left directions from the physical center of the top of the battery as viewed from the top of the battery along the axis of the battery.

4. The portable band saw as in claim 1, wherein the battery is positioned substantially centrally with respect to the right and left directions of the motor receiving portion.

5. A portable band saw comprising:
   a housing with an opening;
   a saw band;
   a motor positioned on the housing and coupled to the saw band, so that the saw band circulates within the housing across the opening; and
   a battery mounted to the housing and connected to the motor to supply a power to the motor,
   wherein the battery has a physical center in right and left directions and in forward and rearward directions, the physical center of the battery being substantially aligned with a physical center of an assembly of elements of the portable band saw at least in the right and left directions as viewed from the top of the battery along an axis of the battery;
   the battery is positioned on an upper side of the housing;
   the portable band saw further includes a first handle and a second handle respectively mounted to a right side and to a left side of the housing in the left and right directions;
   the battery is positioned between the first handle and the second handle in the right and left directions;
   each of the first handle and the second handle has a width in the forward and rearward directions;
   the battery has an outer periphery in plan view as viewed from a top of the battery along the axis of the battery, the outer periphery of the battery in the forward and rearward directions being positioned within the width of at least one of the first handle and the second handle as viewed from the top of the battery along the axis of the battery; and
   substantially the entire battery protrudes beyond the first handle and the second handle in a direction away from the housing along the axis of the battery.

6. The portable band saw as in claim 5, wherein:
   the opening extends through a thickness of a portion of the housing and has a length in the forward and rearward directions, extending from a forward edge of the housing, that is shorter than a length of the housing in the forward and rearward directions, and the battery is positioned in the rearward direction from the opening in a manner such that the outer periphery of the battery in the forward direction does not extend across a rearward edge of the opening when viewed from the top of the battery along the axis of the battery.

7. The portable band saw as in claim 5, wherein:

the opening extends throughout the thickness of a portion of the housing and has boundaries between the opening and the right side and the left side of the housing, respectively; and the battery is positioned so that an outer periphery of the battery in the right and left directions does not extend beyond either of the boundaries.

8. The portable band saw as in claim 7, wherein the battery is positioned at a level above the opening.

9. The portable band saw as in claim 5, wherein the battery is positioned substantially centrally with respect to right and left directions of the opening.

10. A portable band saw comprising:

a housing with an opening, the opening having boundaries between the opening and a right side and a left side of the housing, respectively, and the housing includes a motor receiving portion having width in right and left directions;

a saw band;

a motor positioned on the housing and connected to the saw band; and a battery having an outer periphery in plan view as viewed from a top of the battery along an axis of the battery, the battery being mounted to the housing and electrically connected to the motor, the width of the battery being smaller than a length of the motor in the right and left directions, the outer periphery of the battery in the right and left directions not extending beyond the boundaries of the opening, and the battery being disposed such that the outer periphery of the battery does not extend beyond the length of the motor in the right and left directions, wherein the portable band saw further includes a first handle and a second handle respectively mounted to the right side and the left side of the motor;

the battery is positioned between the first handle and the second handle in the right and left directions;

each of the first handle and the second handle has a width in forward and rearward directions;

the outer periphery of the battery in the forward and rearward directions being positioned within the width of at least one of the first handle and the second handle as viewed from the top of the battery along the axis of the battery; and substantially the entire battery protrudes beyond the first handle and the second handle in a direction away from the housing along the axis of the battery.

11. The portable band saw as in claim 10, wherein the battery is positioned so that the outer periphery in the front direction will not extend into the opening when viewed from the top of the battery along the axis of the battery.

12. The portable band saw as in claim 10, wherein the battery is positioned at a level above the opening.

13. The portable band saw as in claim 10, wherein the battery is positioned substantially centrally with respect to right and left directions of the opening.

* * * * *